US011431220B2

(12) United States Patent
Nakamatsu et al.

(10) Patent No.: US 11,431,220 B2
(45) Date of Patent: Aug. 30, 2022

(54) MOTOR ASSEMBLY INCLUDING INVERTER CASE AND WIRING HARNESS

(71) Applicants: Nidec Corporation, Kyoto (JP); Nidec Tosok Corporation, Zama (JP)

(72) Inventors: Shuhei Nakamatsu, Kyoto (JP); Keisuke Fukunaga, Kyoto (JP); Naohiro Wada, Kyoto (JP); Masumi Mizutani, Zama (JP)

(73) Assignees: NIDEC CORPORATION, Kyoto (JP); NIDEC TOSOK CORPORATION, Kanagawa (JP)

( * ) Notice: Subject to any disclaimer, the term of this patent is extended or adjusted under 35 U.S.C. 154(b) by 400 days.

(21) Appl. No.: 16/655,350

(22) Filed: Oct. 17, 2019

(65) Prior Publication Data

US 2020/0127528 A1 Apr. 23, 2020

(30) Foreign Application Priority Data

Oct. 22, 2018 (JP) .............................. JP2018-198508
Apr. 19, 2019 (JP) .............................. JP2019-080326

(51) Int. Cl.
*H02K 5/22* (2006.01)
*H02K 7/00* (2006.01)
(Continued)

(52) U.S. Cl.
CPC ............ *H02K 5/225* (2013.01); *H02K 7/006* (2013.01); *H02K 9/19* (2013.01); *H02P 25/16* (2013.01)

(58) Field of Classification Search
CPC ........ H02K 5/225; H02K 7/006; H02K 11/33; H02K 9/19; H02K 9/193; H02K 9/197; B60L 1/003
See application file for complete search history.

(56) References Cited

U.S. PATENT DOCUMENTS

2009/0294626 A1 * 12/2009 Abe ...................... B60L 3/0007
248/675
2010/0243321 A1 * 9/2010 Adachi .................. H02G 11/00
174/74 R
(Continued)

FOREIGN PATENT DOCUMENTS

JP  2012-175853 A    9/2012
JP  2014220961 A  * 11/2014
KR  20170098076 A  *  8/2017

OTHER PUBLICATIONS

Ogasawara et al., "Motor Assembly", U.S. Appl. No. 16/655,353, filed Oct. 17, 2019.
(Continued)

*Primary Examiner* — Quyen P Leung
*Assistant Examiner* — Eric Johnson
(74) *Attorney, Agent, or Firm* — Keating & Bennett

(57) ABSTRACT

A motor assembly includes a motor, a housing that houses the motor, an inverter that is electrically connected to the motor, an inverter case that houses the inverter and is provided integrally with the housing, a wire harness including a first connector electrically connected to a connector positioned on a side surface of the inverter case, a second connector electrically connected to a connector of the housing, and an electric wire electrically connecting the first connector and the second connector, and a side connector cover provided over the side surface of the inverter case, covering the first connector laterally.

6 Claims, 9 Drawing Sheets

(51) Int. Cl.
*H02K 9/19* (2006.01)
*H02P 25/16* (2006.01)

(56) References Cited

U.S. PATENT DOCUMENTS

| | | | |
|---|---|---|---|
| 2013/0105218 A1* | 5/2013 | Kuboshima | B60R 16/0215 |
| | | | 174/72 A |
| 2014/0151138 A1* | 6/2014 | Kitami | B60R 16/04 |
| | | | 180/65.21 |
| 2015/0050833 A1* | 2/2015 | Mizutani | B60L 50/61 |
| | | | 439/527 |
| 2015/0129345 A1 | 5/2015 | Suzuki et al. | |

OTHER PUBLICATIONS

Nakamatsu et al., "Motor Assembly", U.S. Appl. No. 16/355,344, filed Oct. 17, 2019.
Nakamatsu et al., "Motor Assembly", U.S. Appl. No. 16/655,361, filed Oct. 17, 2019.

* cited by examiner

MOTOR ASSEMBLY INCLUDING INVERTER CASE AND WIRING HARNESS

CROSS REFERENCE TO RELATED APPLICATION

The present invention claims priority under 35 U.S.C. § 119 to Japanese Application No. 2018-198508 filed on Oct. 22, 2018 and Japanese Application No. 2019-080326 filed on Apr. 19, 2019, the entire contents of which are hereby incorporated herein by reference.

1. FIELD OF THE INVENTION

The present invention relates to a motor assembly.

2. BACKGROUND

Conventionally, a motor assembly that rotates an axle of a vehicle is known. Various wire harnesses to be connected to the motor assembly are routed around the motor assembly.

SUMMARY

According to one example embodiment of the present disclosure, a motor assembly includes a motor, a housing that houses the motor, an inverter that is electrically connected to the motor, an inverter case that houses the inverter and is provided integrally with the housing, a wire harness including a first connector electrically connected to a connector positioned on a side surface of the inverter case, a second connector electrically connected to a connector of the housing, and an electric wire electrically connecting the first connector and the second connector, and a side connector cover provided over the side surface of the inverter case, covering the first connector laterally.

The above and other elements, features, steps, characteristics and advantages of the present disclosure will become more apparent from the following detailed description of the example embodiments with reference to the attached drawings.

DETAILED DESCRIPTION

Figure 1:
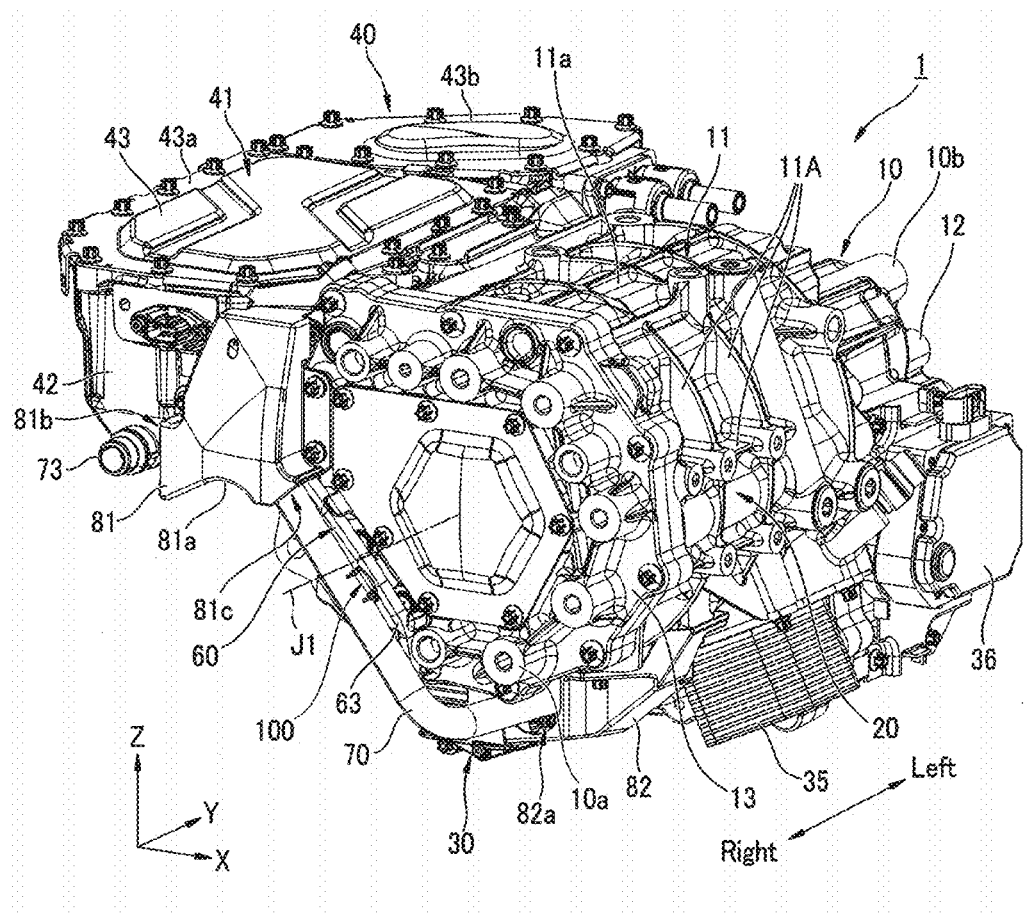
FIG. 1 is a perspective view of a motor assembly according to an example embodiment of the present disclosure as viewed from above.

In the following description, the vertical direction is defined and described based on the positional relationship when a motor assembly 1 of the present example embodiment illustrated in FIG. 1 is mounted on a vehicle positioned on a horizontal road surface. In the accompanying drawings, an XYZ coordinate system is illustrated appropriately as a three-dimensional orthogonal coordinate system. In the XYZ coordinate system, the Z-axis direction is a vertical direction in which the +Z side is an upper side and the −Z side is a lower side. The X-axis direction is a direction orthogonal to the Z-axis direction and is a front-rear direction of a vehicle on which the motor assembly 1 is mounted. In the present example embodiment, the +X side is a front side of a vehicle, and the −X side is a rear side of the vehicle. The Y-axis direction is a direction orthogonal to both the X-axis direction and the Z-axis direction, and is a left-right direction of a vehicle. In the present example embodiment, the +Y side is a left side of a vehicle, and the −Y side is a right side of the vehicle. In the present example embodiment, the right side corresponds to one side in an axial direction, and the left side corresponds to the other side in the axial direction. In the present example embodiment, the front-rear direction corresponds to a predetermined direction.

The positional relationship in the front-rear direction is not limited to the positional relationship in the present example embodiment, and thus the +X side may be the rear side of a vehicle, and the −X side may be the front side of the vehicle. In this case, the +Y side is the right side of the vehicle, and the −Y side is the left side of the vehicle.

Each drawing appropriately illustrates a motor axis J1 that extends in the Y-axis direction, i.e., the left-right direction of a vehicle. In the following description, unless otherwise specified, a direction parallel to the motor axis J1 is simply referred to as an "axial direction", a radial direction around the motor axis J1 is simply referred to as a "radial direction", and a circumferential direction about the motor axis J1, i.e., about of the motor axis J1, is simply referred to as a "circumferential direction". In the present specification, a "parallel direction" includes a substantially parallel direction, and an "orthogonal direction" includes a substantially orthogonal direction.

The motor assembly 1 is mounted on a vehicle using a motor as a power source, such as a hybrid vehicle (HEV), a plug-in hybrid vehicle (PHV), or an electric vehicle (EV), and is used as the power source. As illustrated in FIGS. 1 to 4, the motor assembly 1 includes a housing 10, a motor 20, and an inverter unit 40. Although not illustrated, the motor assembly 1 includes a speed reducer and a differential device.

Figure 2:
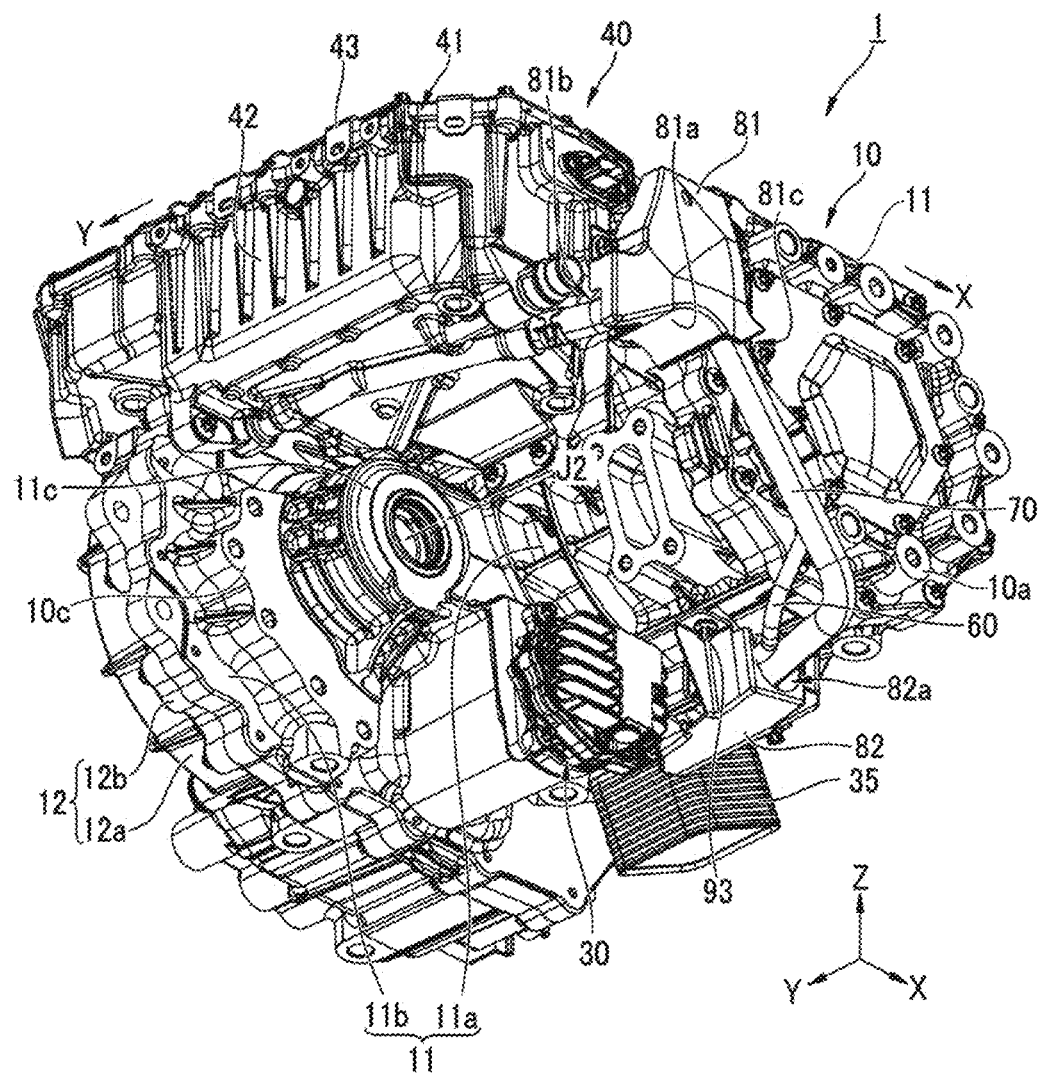
FIG. 2 is a perspective view of a motor assembly of an example embodiment of the present disclosure as viewed from below.
Figure 3:
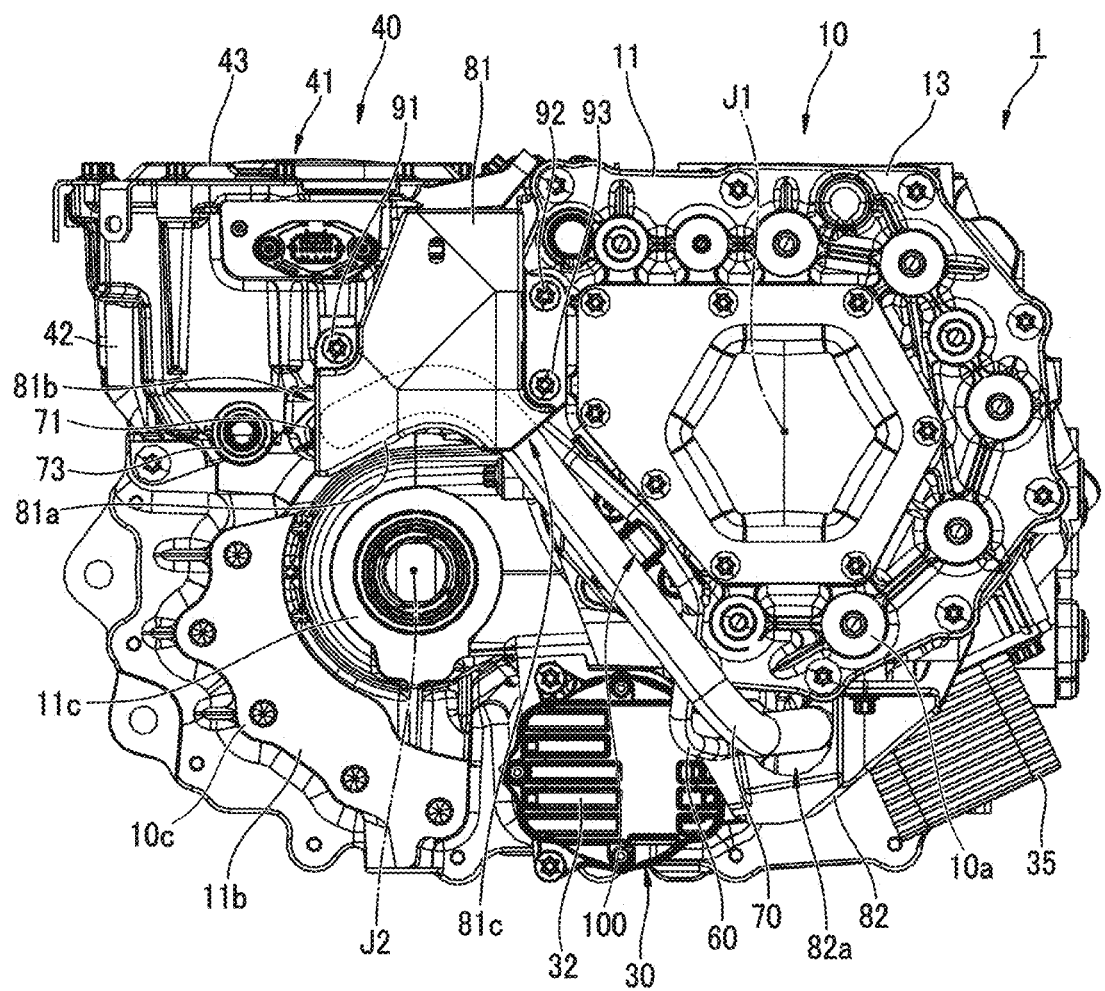
FIG. 3 is a side view of a motor assembly of an example embodiment of the present disclosure.

The housing 10 houses the motor 20, the speed reducer (not illustrated), and the differential device (not illustrated). Although not illustrated, oil is contained in the housing 10. As illustrated in FIGS. 1 to 3, the housing 10 includes a motor housing 11, a gear housing 12, and a motor cover 13.

As illustrated in FIG. 2, the motor housing 11 includes a motor housing body 11a and a connecting portion 11b. The motor housing body 11a has a cylindrical shape surrounding the motor axis J1 and extending in the axial direction. The motor housing body 11a opens to the right being the −Y side in the drawing. The motor housing body 11a houses the motor 20. The connecting portion 11b is provided in a left end portion of the motor housing body 11a. The connecting portion 11b protrudes rearward from the motor housing body 11a.

The motor housing 11 has a plurality of ribs 11A on a surface of the motor housing body 11a having a cylindrical shape. The plurality of ribs 11A includes a rib extending in the circumferential direction at a radial end portion of the motor housing body 11a, and a rib extending in the axial direction. Providing the plurality of ribs 11A enables the motor housing 11 to be improved in rigidity, and noise caused by vibration of the motor housing 11 when the motor 20 is driven to be reduced.

The gear housing 12 is fixed to the left side of the motor housing 11. More specifically, the gear housing 12 is fixed at its right end portion to the connecting portion 11b with a screw. Although not illustrated, the gear housing 12 opens to the right. The gear housing 12 includes a first housing portion 12a and a second housing portion 12b. The first housing portion 12a is positioned on the left side of the motor housing body 11a. The first housing portion 12a houses the speed reducer (not illustrated). The second housing portion 12b is connected to a rear side of the first housing portion 12a. The second housing portion 12b is positioned on the left side of a portion of the connecting portion 11b, protruding rearward from the motor housing body 11a. The second housing portion 12b houses the differential device (not illustrated). The first housing portion 12a protrudes leftward from the second housing portion 12b.

The motor cover 13 is fixed to the right side of the motor housing 11. More specifically, the motor cover 13 is fixed to a right end portion of the motor housing body 11a with a screw. As illustrated in FIG. 1, the motor cover 13 blocks an opening on the right side of the motor housing body 11a.

The motor 20 has a rotor (not illustrated) and a stator (not illustrated). The rotor of the motor 20 rotates about the motor axis J1. The rotor of the motor 20 is connected to the speed reducer (not illustrated) housed in the gear housing 12. Rotation of the motor 20 is decelerated by the speed reducer (not illustrated) and transmitted to the differential device (not illustrated). The differential device transmits torque output from the motor 20 to an axle of a vehicle. The differential device has a ring gear that rotates about a differential axis J2 parallel to the motor axis J1. Torque output from the motor 20 is transmitted to the ring gear via the speed reducer.

As illustrated in FIG. 2, the housing 10 has an axle connecting portion 11c in the connecting portion 11b. The axle connecting portion 11c has a circular opening centered at the differential axis J2. The axle of the vehicle is inserted into the opening of the axle connecting portion 11c and connected to the ring gear of the differential device. The vehicle axle is rotated about the differential axis J2.

As illustrated in FIGS. 1 and 2, the motor assembly 1 includes an oil pump 30, an oil cooler 35, and an electric actuator 36, as auxiliary machines. The oil pump 30 and the oil cooler 35 are disposed in a lower portion of the housing 10. The oil cooler 35 is positioned at a front end bottom of the motor assembly 1. The oil pump 30 is positioned behind the oil cooler 35. The electric actuator 36 is disposed in a front portion of the housing 10. The electric actuator 36 is a driving device for a parking lock mechanism.

Figure 5:
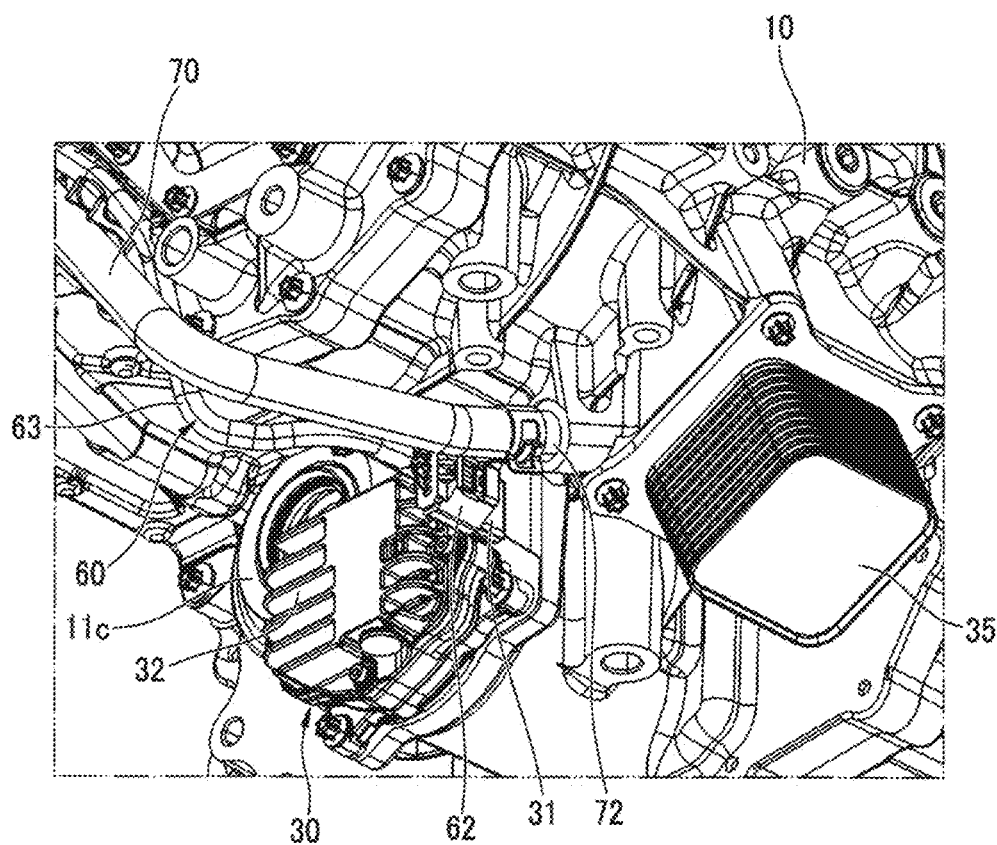
FIG. 5 is a perspective view illustrating an example embodiment of the present disclosure in a state in which a lower connector cover is removed.

The oil pump 30 is disposed along the motor axis J1. As illustrated in FIG. 5, the oil pump 30 includes a connector 31 at its right end, and a heat sink 32. The heat sink 32 is provided in a cover member of the oil pump 30. The heat sink 32 cools a circuit board built in the oil pump 30.

As illustrated in FIGS. 1 and 2, the inverter unit 40 is positioned on a rear side of the housing 10. The inverter unit 40 has an inverter case 41. The inverter case 41 houses an inverter (not illustrated) therein. The inverter in the inverter case 41 is electrically connected to the stator of the motor 20 to drive the motor 20.

The inverter case 41 is fixed to the housing 10. That is, the inverter case 41 is provided integrally with the housing 10. In the present example embodiment, the inverter case 41 is fixed to a radially outer surface of the housing 10. More specifically, the inverter case 41 is fixed to a rear portion of a radially outer surface of the motor housing body 11a. That is, the inverter case 41 is fixed to the rear side of the housing 10 in the front-rear direction orthogonal to the axial direction.

As illustrated in FIG. 1, the inverter case 41 has a substantially rectangular box shape extending in the axial direction. The inverter case 41 has an inverter case body 42 and an inverter cover 43. The inverter case body 42 opens upward and has a substantially rectangular box shape long in the axial direction.

The inverter cover 43 blocks an upper opening of the inverter case body 42. The inverter cover 43 includes a first cover 43a and a second cover 43b. The first cover 43a and the second cover 43b are separated from each other. In the inverter case 41, the inverter (not illustrated) is housed in a portion to which the first cover 43a is attached. In the inverter case 41, a bus bar (not illustrated) connected to the inverter is housed in a portion to which the second cover 43b is attached.

The housing 10 is formed in its outer surface with a plurality of ribs. Accordingly, vibration generated by rotation of the motor 20 and a sound generated by the vibration can be effectively suppressed. The housing 10 is provided in its side surface on the right side being the −Y side with a first attachment portion 10a, in its side surface on the left side being the +Y side with a second attachment portion 10b, and on its rear side with a third attachment portion 10c. Accordingly, the motor assembly 1 can be firmly fixed to a sub frame of the vehicle (not illustrated).

As illustrated in FIGS. 1 to 3, a wire harness 60 and a cooling water hose 70 are routed around the side surface on the right side being the −Y side of the motor assembly 1. Specifically, the wire harness 60 and the cooling water hose 70 extend downward from the side surface on the right side of the inverter case 41 along a lower end portion of the motor cover 13 to be routed below the housing 10.

As illustrated in FIGS. 1 to 3, the motor assembly 1 has a side connector cover 81 around end portions of the wire harness 60 and the cooling water hose 70, close to the inverter case 41. The motor assembly 1 also includes a lower connector cover 82 around end portions of the wire harness 60 and the cooling water hose 70, on a lower side of the motor housing 11. That is, in the motor assembly 1, the wire harness 60 and the cooling water hose extend between the side connector cover 81 and the lower connector cover 82. In the present example embodiment, the cooling water hose 70 is a molded hose formed preliminarily in a predetermined shape.

Figure 4:
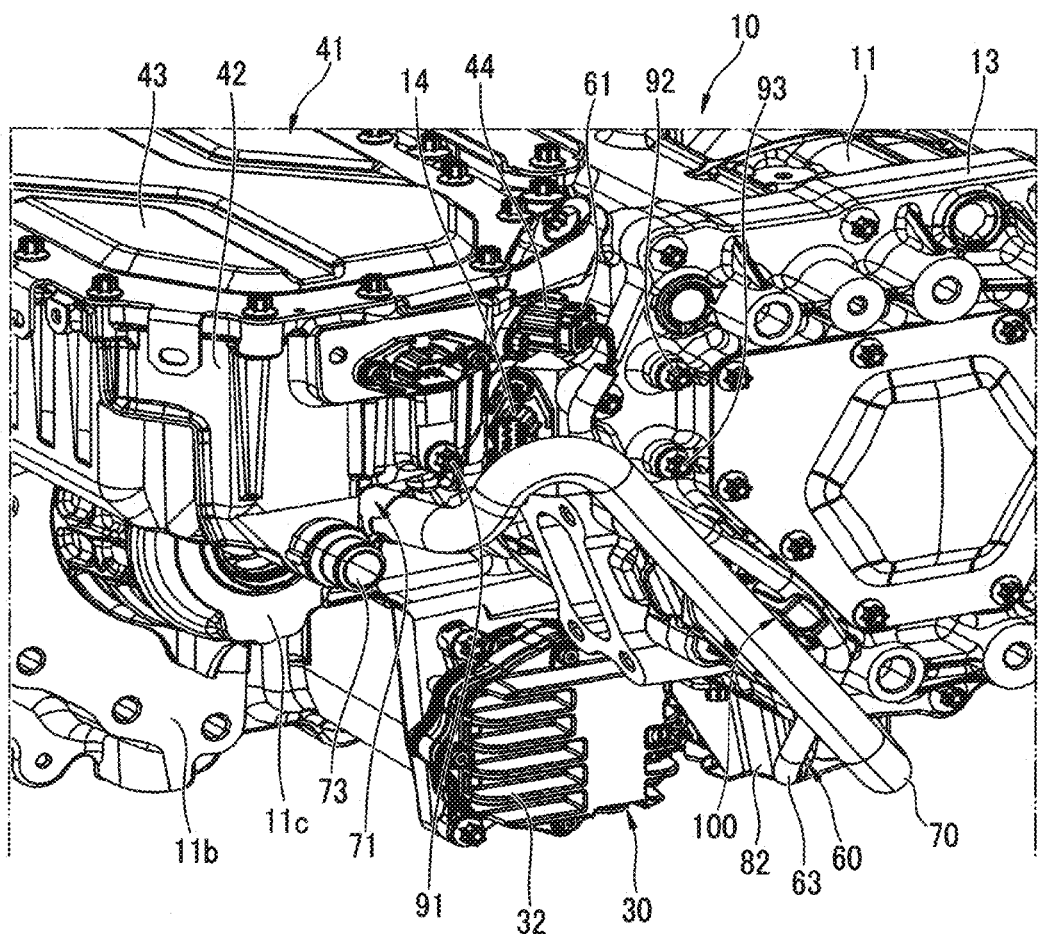
FIG. 4 is a perspective view illustrating an example embodiment of the present disclosure in a state in which a side connector cover is removed.

As illustrated in FIGS. 4 and 5, the wire harness 60 includes a first connector 61 connected to a connector 44 of the inverter case 41, a second connector 62 connected to the connector 31 of the oil pump 30 positioned in a lower portion of the housing 10, and an electric wire 63 connecting the first connector 61 and the second connector 62.

As illustrated in FIG. 4, the inverter case 41 has the connector 44 at a corner of a right side surface of the inverter case body 42 on the front side. The connector 44 protrudes obliquely forward from the corner of the inverter case body 42. The connector 44 is positioned in a gap between the inverter case and the motor housing 11 in the front-rear direction. The connector 44 is connected to the first connector 61 of the wire harness 60.

In the inverter case 41, a connector 14 protruding from a surface of the motor housing 11, facing the rear side, is disposed below the connector 44. The connector 14 of the motor housing 11 is connected to some terminals of the connector 44. Although not illustrated, a wire harness connected to the connector 14 has an electric wire connected to the first connector 61, and a connector connected to the connector 14. The connector 14 of the motor housing 11 protrudes diagonally rearward right from a back surface of the motor housing 11. That is, a protruding direction of the connector 14 is a direction intersecting a protruding direction of the connector 44 of the inverter case 41. In the present example embodiment, the protruding direction of the connector 14 and the protruding direction of the connector 44 are substantially orthogonal when viewed from above.

As illustrated in FIG. 5, the oil pump 30 and the oil cooler 35 are disposed at the lower portion of the housing 10. The oil pump 30 has a connector 31 for power supply and signal input. The second connector 62 of the wire harness 60 is connected to the connector 31 of the oil pump 30.

As illustrated in FIGS. 4 and 5, the cooling water hose 70 is connected to a hose nipple 71 protruding from a right side surface of the inverter case 41 and a hose nipple 72 positioned at the lower portion of the housing 10.

The inverter case 41 has the two hose nipples 71 and 73 in a lower portion of the right side surface of the inverter case body 42. The hose nipple 73 positioned behind the hose nipple 71 is a cooling water supply port to the inverter case 41. The hose nipple 73 is connected to a cooling water hose (not illustrated). The hose nipple 71 positioned in front of the hose nipple 73 is a cooling water discharge port from the inverter case 41.

The hose nipple 72 at the lower portion of the housing 10 is a cooling water supply port to the oil cooler 35 attached to the motor housing 11. Although not illustrated, the housing 10 has a hose nipple as a cooling water discharge port from the oil cooler 35. The cooling water hose 70 is connected at its lower end to the hose nipple 72.

The hose nipple 72 and the connector 31 of the oil pump 30 are disposed at positions close to each other in the lower portion of the housing 10. Specifically, the oil cooler 35 and the oil pump 30 are disposed back and forth, side by side. The hose nipple 72 connected to the oil cooler 35 is positioned in a rear end portion of the oil cooler 35. The connector 31 of the oil pump 30 is positioned in a front end portion of the oil pump 30.

As illustrated in FIG. 3, the side connector cover 81 is configured to laterally cover the connector 44 of the inverter case 41, the first connector 61 of the wire harness 60, the connector 14 of the housing 10, and a part of the cooling water hose 70.

Thus, the motor assembly 1 of the present example embodiment has the side connector cover 81 covering the first connector 61 laterally, on the right side surface of each of the inverter case 41 and the housing 10. According to this structure, even when an impact is applied from a side surface of the vehicle, the first connector 61 is protected by the side connector cover 81, and thus the wire harness 60 is less likely to be broken even in the event of a collision.

In the present example embodiment, the connector 14 of the housing 10 is also covered laterally with the side connector cover 81, so that the wire harness connecting the connector 44 and the connector 14 is also protected by the side connector cover 81.

As illustrated in FIGS. 2 and 3, the side connector cover 81 has a bottom wall portion 81a facing downward, a rear opening 81b that opens behind the bottom wall portion 81a, and a front opening 81c that opens in front of the bottom wall portion 81a. As illustrated in FIG. 3, the bottom wall portion 81a is positioned above the axle connecting portion 11c. The connector 14, the connector 44, and the first connector 61 illustrated in FIG. 4 are disposed above the bottom wall portion 81a. When viewed from the axle connected to the axle connecting portion 11c, the connector 14, the connector 44, and the first connector 61 are covered with the bottom wall portion 81a.

That is, the motor assembly 1 of the present example embodiment includes the housing 10 having the axle connecting portion 11c to which the axle of the vehicle is connected, the inverter case 41 having the connector 44 positioned radially outside the axle connected to the axle connecting portion 11c, and the side connector cover 81 covering the first connector 61 when viewed from the axle.

According to this structure, even when a stepping stone hits the axle rotating in the lower portion of the motor assembly 1 and jumps upward or liquid adhering to the axle is scattered, the first connector 61 is protected by the bottom wall portion 81a of the side connector cover 81. Thus, the connector can be effectively protected from a stepping stone or the like when the vehicle travels.

Figure 6:
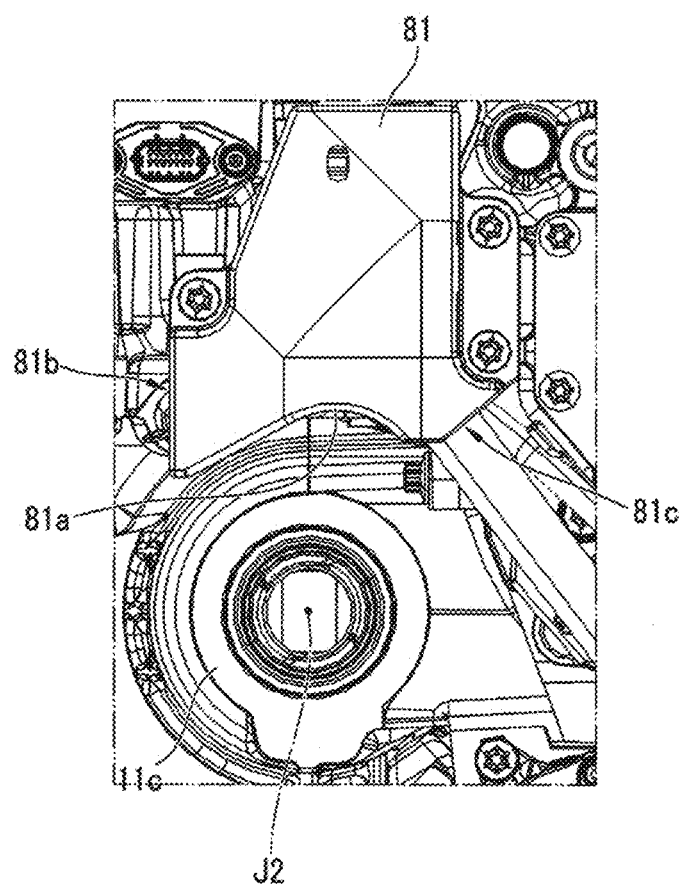
FIG. 6 is a side view illustrating a side connector cover and an axle connecting portion according to an example embodiment of the present disclosure.

As illustrated in FIGS. 2 and 6, the bottom wall portion 81a has a lower surface that is an upwardly convex curved surface extending along curvature of the axle connected to the axle connecting portion 11c. The lower surface of the bottom wall portion 81a is a curved surface, so that a foreign matter such as a stone flying after hitting against the axle can be bounced toward a road surface by the lower surface of the bottom wall portion 81a. Accordingly, a foreign matter bounced off the side connector cover 81 can be prevented from hitting or adhering to another portion of the motor assembly 1.

The axle also has a boot (not illustrated) to increase in radial size than the axle. When the bottom wall portion 81a is provided, the boot can be prevented from coming into contact with the connector or the like due to deflection of the axle caused when the vehicle with the axle rotating at high speed climbs a step or the like.

In the present example embodiment, the side connector cover 81 holds a part of the cooling water hose 70 in a space between the side connector cover 81 and the inverter case 41, as illustrated in FIG. 3. The cooling water hose 70 is connected at its end behind the side connector cover 81 to the hose nipple 71 in the rear opening 81b. The cooling water hose 70 has a front portion extending downward and forward from the front opening 81c of the side connector cover 81.

According to this structure, the cooling water hose 70 is held at a position preventing the cooling water hose 70 from protruding to the right side of the motor assembly 1, so that the motor assembly 1 can be reduced in axial length. In addition, the cooling water hose 70 is less likely to interfere when the motor assembly 1 is mounted on a vehicle, so that workability is improved. The above structure enables preventing the cooling water hose 70 from coming into contact with a vehicle frame and the like, so that unintended wear or breakage of the cooling water hose 70 can be suppressed.

The side connector cover 81 is disposed extending over the inverter case 41 and the housing 10 when viewed laterally, and is fixed to both the inverter case 41 and the housing 10. Specifically, as illustrated in FIG. 3, the side connector cover 81 is fixed to the inverter case 41 with a bolt 91 and fixed to the motor cover 13 of the housing 10 with two bolts 92 and 93.

According to this structure, the side connector cover 81 can more reliably protect both the connector 44 of the inverter case 41 and the connector 14 of the housing 10. If the side connector cover 81 is fixed only to the inverter case 41, the side connector cover 81 has a portion covering the connector 14 of the housing 10, being not fixed, and thus the housing 10 and the side connector cover 81 may vibrate to generate noise, or a stepping stone and water are likely to enter a gap between the housing 10 and the side connector cover 81. Thus, according to the structure of the present example embodiment, connector protection using the side connector cover 81 becomes more reliable.

As illustrated in FIG. 3, the side connector cover 81 is configured to laterally cover the connector 44 of the inverter case 41, the first connector 61 of the wire harness 60, the connector 14 of the housing 10, and a part of the cooling water hose 70.

Thus, the motor assembly 1 of the present example embodiment has the side connector cover 81 covering the first connector 61 laterally, on the right side surface of each of the inverter case 41 and the housing 10. According to this structure, even when an impact is applied from a side surface of the vehicle, the first connector 61 is protected by the side connector cover 81, and thus the wire harness 60 is less likely to be broken even in the event of a collision.

As illustrated in FIGS. 2 and 5, the lower connector cover 82 is configured to cover the connector 31 of the oil pump 30, the second connector 62 of the wire harness 60 connected to the connector 31, and the hose nipple 72 of the housing 10, from below in the lower portion of the housing 10. As illustrated in FIGS. 2 and 3, the lower connector cover 82 has an opening 82a that opens to the right. The wire harness 60 and the cooling water hose 70 are inserted into the lower connector cover 82 through the opening 82a. The lower connector cover 82 is fixed to a lower surface of the motor housing 11 with a plurality of bolts including the bolt 93 illustrated in FIG. 2.

Thus, the motor assembly 1 of the present example embodiment has the lower connector cover 82 covering the second connector 62 from below in the lower portion of the housing 10. According to this structure, the second connector 62 is protected from a stepping stone, road surface water, and the like in the lower portion of the motor assembly 1, exposed to a lower surface of the vehicle, so that the wire harness 60 is unlikely to be broken in the connector and its surroundings.

According to the motor assembly 1 of the present example embodiment, the second connector 62 of the wire harness 60 is protected by the lower connector cover 82 even when an electronic component such as the oil pump 30 is disposed in the lower portion of the motor assembly 1. That is, the motor assembly 1 of the present example embodiment enables a connector that may be disconnected and its surroundings to be disposed in the lower portion of the motor assembly 1. Thus, according to the present example embodiment, restrictions on placement of an electronic component in the motor assembly 1 are reduced.

The motor assembly 1 of the present example embodiment includes the cooling water hose 70 connected to the hose nipple 71 of the inverter case 41 and the hose nipple 72 of the housing 10, and the lower connector cover 82 covering the second connector 62 and the hose nipple 72 of the housing 10 from below. According to this structure, a connection portion of the cooling water hose 70 is also protected from a stepping stone.

In the present example embodiment, the connector 31 of the oil pump 30 and the hose nipple 72 are disposed close to each other, so that the lower connector cover 82 covering the connector 31 and the hose nipple 72 can be reduced in size. This enables structure in which while only a portion necessary to be protected from a stepping stone is covered with the lower connector cover 82 in the lower portion of the motor assembly 1, a portion requiring cooling, for example, is not covered with the lower connector cover 82.

Specifically, the motor assembly 1 of the present example embodiment includes the oil pump 30 having the heat sink 32 that cools internal components of the oil pump 30, the heat sink 32 being positioned outside the lower connector cover 82. According to this structure, the heat sink 32 is exposed to the lower portion of the motor assembly 1, so that the heat sink 32 and the internal components of the oil pump 30 are efficiently cooled when the vehicle travels.

In a motor assembly mounted on a vehicle, a cable and a hose are routed around a motor and a gear. The cable and the hose need to be fixed to the motor assembly or a vehicle frame to prevent contact with a movable part such as an axle. The motor assembly 1 of the present example embodiment includes a fixing member 100 that can efficiently fix a cable and a hose.

Figure 7:
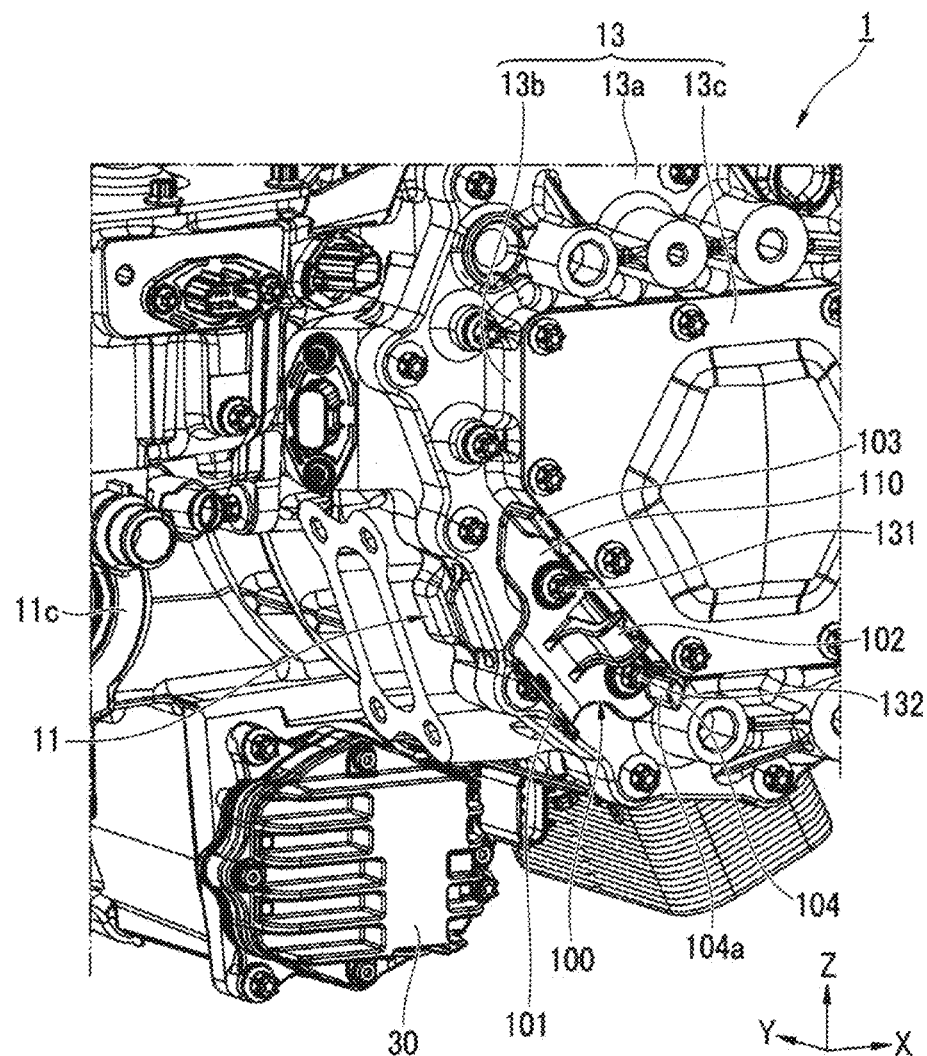
FIG. 7 is a partial perspective view illustrating an attachment state of a fixing member according to an example embodiment of the present disclosure.

As illustrated in FIG. 7, the fixing member 100 is fixed to a surface of the motor cover 13, facing the right side (−Y side). In the present example embodiment, the fixing member 100 is fixed to the motor cover 13 using two bolts 131 and 132. More specifically, the motor cover 13 includes a cover body 13a fastened to the motor housing 11, a cylindrical portion 13b protruding rightward from the cover body 13a, and a lid portion 13c fixed to a right end of the cylindrical portion 13b. The fixing member 100 is bolted to a surface facing the right side (−Y side) of the cover body 13a. The cylindrical portion 13b has a polygonal shape when viewed in the axial direction, and the fixing member 100 is disposed along a flat surface of the cylindrical portion 13b, facing rearward and downward.

Figure 8:
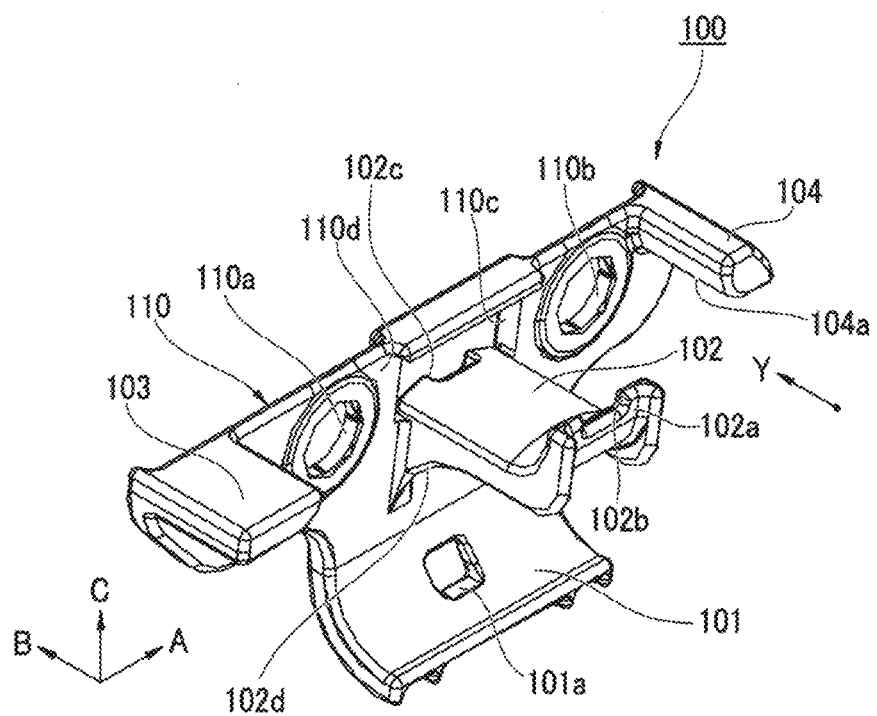
FIG. 8 is a perspective view of a fixing member according to an example embodiment of the present disclosure.

As illustrated in FIG. 8, the fixing member 100 has a base portion 110 having an elongated plate-like shape extending in one direction. The base portion 110 has two screw insertion holes 110a and 110b passing through the base portion 110 in its plate thickness direction, and a through hole 110c. That is, the fixing member 100 has the base portion 110 fixed to the housing 10.

In the following description, as illustrated in FIG. 8, there is appropriately used a coordinate system in which an extending direction of the base portion 110 is referred to as A-axis, a plate thickness direction orthogonal to a plate surface of the base portion 110 is referred to as B-axis, and a direction orthogonal to the A-axis and the B-axis, extending along the plate surface of the base portion 110, is referred to as C-axis. The fixing member 100 may be described in the description as follows: −A side of the fixing member 100 is referred to as a holder base end side; +A side is referred to as a holder leading end side, −B side is referred to as a holder front surface side; +B side is referred to as a holder back surface side; +C side is referred to as a holder upper side; and −C side is referred to as a holder lower side. In the present example embodiment, the B-axis in FIG. 8 is parallel to the Y-axis in which the motor axis J1 extends.

The fixing member 100 includes a first holding portion 101 extending from a long side of the base portion 110 on the holder lower side (−C side) to the outside of the base portion 110 (−C direction). The fixing member 100 has a second holding portion 102, a third holding portion 103, and a fourth holding portion 104, each protruding from a plate surface 110*d* on the holder front surface side (−B side) of the base portion 110 in a holder front face direction (−B direction).

In the base portion 110, the screw insertion hole 110*a*, the through hole 110*c*, and the screw insertion hole 110*b* are aligned in this order along a direction in which the base portion 110 extends (A-axis direction).

The first holding portion 101 is curved toward the holder front surface side (−B side) as extending toward the holder lower side (−C side). The first holding portion 101 is provided in its central portion in a direction in which the base portion 110 extends (A-axis direction) with a binding band insertion hole 101*a* passing through the first holding portion 101 in its plate thickness direction.

Figure 9:
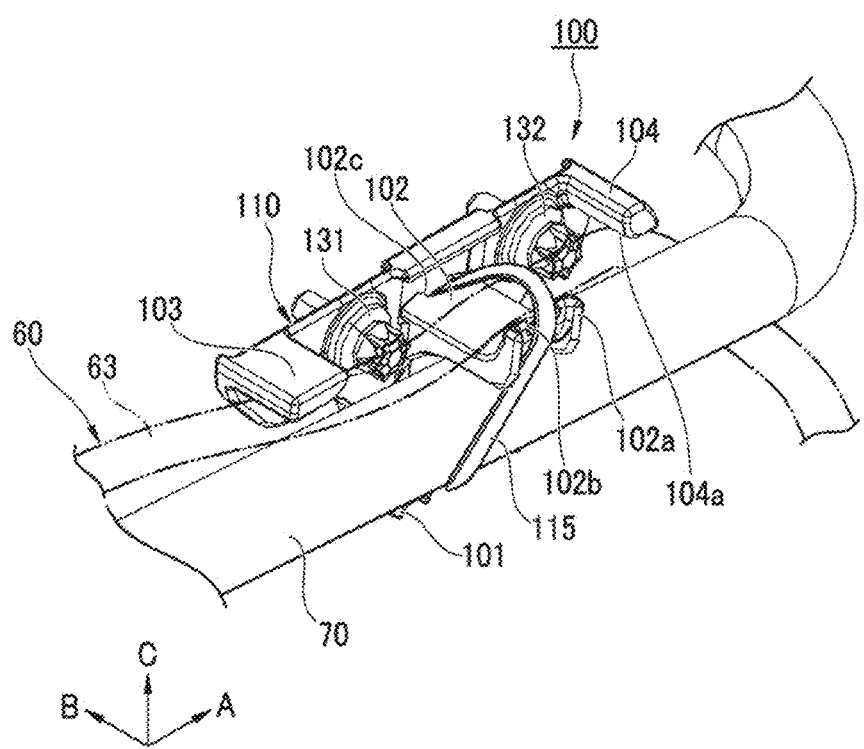
FIG. 9 is a diagram illustrating routing of a cooling water hose and a wire harness in a fixing member according to an example embodiment of the present disclosure.

The second holding portion 102 protrudes from a central portion in the extending direction of the base portion 110 toward the holder front surface side (−B side) of the base portion 110. The second holding portion 102 is provided at its leading end on the holder front side with a flange portion 102*a* bending toward the holder upper side (+C side). The second holding portion 102 has a substantially L-shape when viewed along a direction in which the base portion 110 extends (A-axis direction). The flange portion 102*a* is provided at its end on the holder upper side with a recessed portion 102*b* recessed toward the holder lower side (−C side). As illustrated in FIG. 9, a binding band 115 having passed through the binding band insertion hole 101*a* can be hooked into the recessed portion 102*b*.

The second holding portion 102 has an end on the holder back surface side (+B side) that is positioned at an edge of the through hole 110*c* on the holder lower side. The second holding portion 102 is provided at its end on the holder back surface side with a recessed portion 102*c* recessed toward the holder front surface side. As illustrated in FIG. 9, the binding band 115 having passed through the binding band insertion hole 101*a* can be hooked into the recessed portion 102*c*. The screw insertion hole 110*a* is positioned on the holder base end side (−A side) of the second holding portion 102, and the screw insertion hole 110*b* is positioned on the holder leading end side (+A side).

The third holding portion 103 is positioned at an end of the base portion 110 on the holder base end side. The third holding portion 103 is positioned closer to a holder base end than the screw insertion hole 110*a*. The third holding portion 103 protrudes from the long side of the base portion 110 on the holder upper side to the holder front surface side. The third holding portion 103 is a protrusion having a rectangular plate-like shape. In FIG. 8, the third holding portion 103 has a plate surface facing the vertical direction (C-axis direction) of the fixing member 100.

The fourth holding portion 104 is positioned at an end of the base portion 110 on the holder leading end side. The fourth holding portion 104 is positioned closer to a holder leading end than the screw insertion hole 101*b*. The fourth holding portion 104 protrudes from an end of the base portion 110 on the holder upper side (+C side) toward the holder front surface side. The fourth holding portion 104 has a columnar shape extending along a protruding direction of the fourth holding portion 104.

The fourth holding portion 104 has a thickness larger than a plate thickness of the third holding portion 103 in the vertical direction (C-axis direction) of the fixing member 100. That is, the fourth holding portion 104 has a surface on the holder lower side (−C side) positioned closer to a holder lower side than a surface of the third holding portion 103 on the holder lower side. The fourth holding portion 104 is provided in its surface facing the holder lower side with a pressing surface 104*a* pressing the wire harness 60.

As illustrated in FIG. 7, the fixing member 100 is fastened to the cover body 13*a* of the motor cover 13 with the two bolts 131 and 132 having passed through the screw insertion holes 110*a* and 110*b*, respectively. The bolts 131 and 132 each have a head protruding from the plate surface 110*d* of the base portion 110 toward the holder front surface side. The first holding portion 101 to the fourth holding portion 104 of the fixing member 100 protrude from the motor cover 13 toward the right side (−Y side) of the motor assembly 1.

The third holding portion 103 and the fourth holding portion 104 of the fixing member 100 are disposed along an outer peripheral surface of the cylindrical portion 13*b* of the motor cover 13. That is, in the radial direction of the motor axis J1, the first holding portion 101 of the fixing member 100 is positioned outside the second holding portion 102 to the fourth holding portion 104.

As illustrated in FIGS. 1 to 3, the fixing member 100 holds the wire harness 60 and the cooling water hose 70, extending from the right side surface of the inverter unit 40 to the lower portion of the motor housing 11. The wire harness 60 and the cooling water hose 70 are fixed to the motor cover 13 with the fixing member 100 at an intermediate position in a routing path. That is, the wire harness 60 and the cooling water hose 70 are fixed to the housing 10 with the fixing member 100.

As illustrated in FIG. 9, the cooling water hose 70 is disposed between the first holding portion 101 and the second holding portion 102 of the fixing member 100. The cooling water hose 70 is sandwiched between a surface of the first holding portion 101, facing the holder upper side, and a surface of the second holding portion 102, facing the holder lower side.

The electric wire 63 of the wire harness 60 is held by the second holding portion 102 to the fourth holding portion 104. The electric wire 63 extends from the connector 44 illustrated in FIG. 4 toward the lower portion of the motor assembly 1. As illustrated in FIG. 9, the electric wire 63 extends along the cooling water hose 70, and extends from a portion of the fixing member 100, on the holder base end side (−A side), to the fourth holding portion 104 through a portion of the third holding portion 103, on the holder lower side (−C side), and a portion of the second holding portion 102, on the holder upper side (+C side), and then is pulled out from a portion of the fourth holding portion 104, on the holder lower side, to the outside (+A side) of the fixing member 100.

The electric wire 63 is held and sandwiched in the vertical direction (C-axis direction) of the fixing member 100 by a surface of the second holding portion 102, facing the holder upper side (+C side), a surface of the third holding portion 103, facing the holder lower side (−C side), and a surface of the fourth holding portion 104, facing the holder lower side. In the present example embodiment, the electric wire 63 is pressed toward the holder lower side by the third holding portion 103 and the fourth holding portion 104, and pressed toward the holder upper side at a position of the second holding portion 102 to meander gently in the fixing member 100. Accordingly, the electric wire 63 is firmly held by the second holding portion 102 to the fourth holding portion 104.

Thus, according to the fixing member 100, the wire harness 60 and the cooling water hose can be stably held with a simple structure using the first holding portion 101 to the fourth holding portion 104.

In the present example embodiment, the electric wire 63 is also held and sandwiched in a depth direction (A-axis direction) of the fixing member 100 by a surface of the bolt 131, facing the holder front surface side (−B side), a surface of the flange portion 102a of the second holding portion 102, facing the holder back surface side (+B side), and a surface of the bolt 132, facing the holder front surface side. Thus, with the fixing member 100, the wire harness 60 can be sandwiched from a plurality of directions to be stably held.

As illustrated in FIGS. 7 and 1 to 3, a position where the fixing member 100 is disposed corresponds to a circumferential position facing the axle connected to the axle connecting portion 11c in the circumferential direction of the motor housing 11. The electric wire 63 and the cooling water hose 70 of the wire harness 60 are each disposed side by side in the radial direction at a position facing the axle, and the second holding portion 102 is positioned between the electric wire 63 and the cooling water hose 70. According to this structure, the fixing member 100 can prevent the electric wire 63 from moving toward the axle with the second holding portion 102. Thus, according to the present example embodiment, the wire harness 60 routed around the motor assembly 1 can be effectively protected.

In the present example embodiment, the fourth holding portion 104 of the fixing member 100 has the pressing surface 104a, and the pressing surface 104a is positioned closer to the holder lower side than the surface of the third holding portion 103, facing the holder lower side. As illustrated in FIG. 9, this structure enables the electric wire 63 to be bent toward the holder lower side at an end of the fixing member 100 on the holder leading end side to pass through a space between the base portion 110 (+B side) and the cooling water hose 70. Accordingly, the electric wire 63 extending outward from the fixing member 100 is disposed behind the cooling water hose 70 as viewed from the axle. As a result, the electric wire 63 and the axle can be further less likely to come into contact with each other. In addition, the electric wire 63 is greatly bent by the pressing surface 104a to cause the fixing member 100 to have an increased force for holding the electric wire 63, so that the fixing member 100 can more stably hold the electric wire 63.

While in the present example embodiment, the cooling water hose 70 is held between the first holding portion 101 and the second holding portion 102, and the wire harness 60 is held between the second holding portion 102, and the third holding portion 103 and the fourth holding portion 104, the present disclosure is not limited to this structure. That is, the wire harness 60 may be held between the first holding portion 101 and the second holding portion 102, and the cooling water hose 70 may be held with the second holding portion 102 to the fourth holding portion 104. However, in this case, the fixing member 100 is fixed to the housing 10 causing the first holding portion 101 holding the wire harness 60 to face a side opposite to the axle.

While in this example embodiment, the fixing member 100 having the base portion 110 and the first holding portion 101 to the fourth holding portion 104 is used to dispose the electric wire 63 of the wire harness 60 farther away than the cooling water hose 70 when viewed from the axle, the fixing member 100 of the present example embodiment may not be used. For example, a binding band may be used as the fixing member. That is, the wire harness 60 and the cooling water hose 70 may be fixed to the motor cover 13 or the motor housing 11 while being bundled using the binding band. Even in this case, as far as the wire harness 60 is disposed at a position farther away than the cooling water hose 70 when viewed from the axle, an effect of suppressing contact between the wire harness 60 and the axle to protect the wire harness 60 can be obtained.

Each of the structures described in the present specification can be combined suitably in the range consistent with each other.

Each of the structures described in the present specification can be combined suitably in the range consistent with each other. While in the present disclosure, the connection structure between the connector 44 provided in the inverter case 41 and the connector 31 of the oil pump 30 is described, the inverter case 41 may be connected to an auxiliary machine other than the oil pump 30. For example, the electric actuator 36 of a parking lock mechanism may be used.

While in the present example embodiment, the wire harness 60 and the cooling water hose 70 extend from the side surface of the inverter case 41 to the lower surface of the housing 10, the present disclosure is not limited to this structure. For example, at least one of the wire harness 60 and the cooling water hose 70 may extend from the upper surface, the back surface, or the lower surface of the inverter case 41 to the lower surface of the housing 10.

While the cooling water hose 70 is preferably a molded hose, it may be a hose made of silicon or the like, or a flexible hose that is not molded.

While in the present example embodiment, the housing 10 and the inverter case 41, which are separate from each other, are connected and integrated, the housing 10 and the inverter case 41 may be a single member.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A motor assembly comprising:
   a motor;
   a housing that houses the motor;
   an inverter that is electrically connected to the motor;
   an inverter case that houses the inverter and is provided integrally with the housing;
   a wire harness including a first connector electrically connected to a connector positioned on a side surface of the inverter case, a second connector electrically connected to a connector of the housing, and an electric wire electrically connecting the first connector and the second connector;
   a side connector cover provided over the side surface of the inverter case, covering the first connector laterally; and
   a cooling water hose connected to a hose nipple of the inverter case; wherein
   the side connector cover holds a portion of the cooling water hose in a space between the side connector cover and the inverter case.

2. The motor assembly according to claim 1, wherein
   the housing includes an axle connecting portion to which an axle of a vehicle is connected;
   the inverter case including the connector is positioned radially outside the axle connected to the axle connecting portion; and
   the first connector is covered with the side connector cover when viewed from the axle.

3. The motor assembly according to claim 2, wherein
the side connector cover includes a bottom wall portion positioned between the first connector and the axle; and
the bottom wall portion includes a surface facing the axle, having a curved shape protruding toward a side opposite to the axle.

4. The motor assembly according to claim 1, wherein the connector of the housing protrudes from a surface of the housing to be laterally covered by the side connector cover.

5. The motor assembly according to claim 4, wherein the side connector cover extends over the inverter case and the housing when viewed laterally, and is fixed to both the inverter case and the housing.

6. The motor assembly according to claim 1, further comprising:
a lower connector cover covering the second connector from below; wherein
the second connector is electrically connected to the connector of the housing, the connector of the housing being positioned in a lower portion of the housing.

* * * * *